United States Patent
Bacardit et al.

(10) Patent No.: US 6,711,981 B2
(45) Date of Patent: Mar. 30, 2004

(54) SERVOMOTOR WITH A DEFORMATION-ADJUSTABLE SLEEVE AND SETUP FOR THE ADJUSTMENT OF SUCH SLEEVE

(75) Inventors: Joan Simon Bacardit, Barcelone (ES); Fernando Sacristan, Barcelona (ES)

(73) Assignee: Bosch Sistemas de Frenado S.L., Barcelone (ES)

( * ) Notice: Subject to any disclaimer, the term of this patent is extended or adjusted under 35 U.S.C. 154(b) by 86 days.

(21) Appl. No.: 09/890,640

(22) PCT Filed: May 18, 2001

(86) PCT No.: PCT/FR01/01551
§ 371 (c)(1),
(2), (4) Date: Aug. 3, 2001

(65) Prior Publication Data

US 2003/0075976 A1 Apr. 24, 2003

(51) Int. Cl.[7] .................................................. F15B 9/10
(52) U.S. Cl. ...................................... 91/369.3; 91/369.2
(58) Field of Search .............................. 91/369.2, 369.3, 91/376 R

(56) References Cited

U.S. PATENT DOCUMENTS 6,092,453 A * 7/2000 Preker ..................... 91/369.2

* cited by examiner

*Primary Examiner*—F. Daniel Lopez
(74) *Attorney, Agent, or Firm*—Leo H McCormick, Jr.; Warren Comstock

(57) ABSTRACT

A plunger arrangement (46,56,58) for a braking servomotor that has an actuating piston to provide a force to activate a master cylinder. The plunger arrangement (46,56,58) is located in a bore of a movable wall (14) that separates the interior of the servomotor into a front chamber and rear chamber, The plunger arrangement (46,56,58) is connected to a resiliently returned control rod (38) and slides in bore as a function of an input force to define a braking application. The end of the plunger arrangement (46,56,58) is slidingly fitted so as to bias a reaction disk of the actuating rod and transmit a reaction force to the control rod. The plunger arrangement (46,56,58) includes a unidirectional clutch device (56) comprising a key (60) and a sleeve (58) that are slidably mounted on a plunger (46) such that when the control rod (38) is actuated at a given speed the sleeve (58) is locked in the bore of the movable wall (14), independently of the control rod (38), to maintain a braking application.

9 Claims, 4 Drawing Sheets

SERVOMOTOR WITH A DEFORMATION-ADJUSTABLE SLEEVE AND SETUP FOR THE ADJUSTMENT OF SUCH SLEEVE

This invention relates to a pneumatic servomotor used for assisting in the braking of a motor vehicle.

BACKGROUND OF THE INVENTION

More particularly, the present invention relates to a pneumatic servomotor for an assisted braking of a motor vehicle, of the type comprising a rigid casing, in which a transverse partition wall is movable, thus defining in an airtight manner a front chamber under a first engine negative pressure, and a rear chamber under a second pressure, varying between the engine negative pressure and the atmospheric pressure; of the type including a moving piston, integral with the moving partition wall and travelling with the latter, and a control rod, moving inside the piston, in a selective manner as a function of an axial input force, exerted in the forward direction against a return force applied to the rod by a return spring; of the type according to which the control rod is biased towards either an intermediate actuation position or an end actuation position, resulting from the applying of the input force at a determined high speed; of the type comprising a plunger, arranged at the front part of the control rod inside the piston, and a three-way valve, including at least an annular seat borne by a rear section of the plunger, and capable of varying the second pressure, prevailing within the rear chamber, particularly by connecting the front chamber with the rear chamber when the control rod is in the rest position, or by gradually connecting the rear chamber with the atmospheric pressure when the control rod is actuated; of the type in which, in the end actuation position of the control rod, a rear face of a finger, which is slidingly fitted at the front end of the plunger, is biased by the plunger so that a front face of the finger may come into contact with a reaction disk, integral with the moving piston, so as to transmit the reaction force of the moving piston to the plunger and to the control rod; and of the type comprising a unidirectional clutch device, which includes at least one coaxial tubular sleeve, sliding on the plunger and the front end of which comprises the finger, and a latching element, movable between an active position, in which it does not cooperate with the sleeve, and an active position, controlled by the end actuation position of the control rod and in which it cooperates with a locking element of the sleeve, so as to lock the latter in an end front axial position in such a way that the finger may lock the moving piston, independently of the plunger and of the control rod.

In a well-known manner, such a design is most suitable as regards safety, in the case of an emergency braking situation.

As a matter of fact, a conventional servomotor comprises neither a finger nor a unidirectional clutch device for the finger. Thus the plunger is likely to bias directly the reaction disk, integral with the rear face of the moving piston.

In a full-braking situation, in which case a maximum braking force is applied on the control rod, the actuation of the control rod causes the finger-forming plunger to be actuated, which fact results in the maximum opening of the three-way valve and, therefore, the rear chamber is subjected to the atmospheric pressure. Thus, the moving partition wall travels forward and the end of the plunger contacts the reaction disk, integral with the rear face of the moving piston.

Therefore, the force, which is applied onto the moving piston when the control rod reaches the end of its stroke, results from the assisting force, arising from the pressure difference between each side of the moving partition wall, and from the force exerted by the finger-forming plunger onto said moving piston. Besides, the driver feels the braking reaction force, which is transmitted from the moving piston to the plunger, through the reaction disk.

As a matter of fact, it has been established that quite a number of drivers, when confronted with an emergency braking situation, underestimated the risks actually incurred and, after having jammed the brakes on, would somewhat release the braking force at the very time when a considerable force should have been maintained in order to avoid an accident.

In the case of a full-braking situation, accompanied by the swift travel of the control rod, the plunger may touch the reaction disk and therefore give the driver the feeling of a maximum braking action even before the pressure difference between the front and rear chambers actually reaches its maximum value, which may lead the driver to release the braking force even though it should be maintained so as to profit by the maximum braking force.

A servomotor, like that of the above-described type, makes it possible to eliminate such a disadvantage, in that the finger is locked into contact with the reaction disk, through the fixing of the sleeve, which results in a maximum force being maintained on the rear face of the moving piston, even though the driver may have released the braking force in part.

Besides, a unidirectional clutch device for such a servomotor has a substantially low manufacturing cost, since the finger is combined with the sleeve.

Yet, the servomotor of the previously described type has the disadvantage of requiring the compliance with accurate manufacturing dimensions for the sleeve.

As a matter of fact, in such a servomotor, the sleeve incorporating the finger is mounted in such a way that, in the rest position, a given clearance may be extant between the finger and the reaction disk.

The size of the clearance determines the assisting force actually supplied by the moving piston and for which a reaction force is transmitted, through the reaction disk, from the moving piston to the control rod. The magnitude of said assisting force is commonly called the "jump" of the servomotor and, as a result, it depends on the finger dimensions and, in particular, on the finger thickness.

Moreover, in such a servomotor, if the input force happens to be applied onto the control rod at a higher speed than the determined speed, the axial position of the locking element of the sleeve conditions the speed at which the unidirectional clutch device is likely to start.

The speed is commonly known as the "tripping speed" and, therefore, it depends on given dimensions of the sleeve, more particularly the axial distance between the front end of the plunger and the locking element of the sleeve.

Conventionally, the locking element of the sleeve is a shoulder-forming transverse face, thus resulting in a sleeve which is suitable for a sound performance of the servomotor, when the sleeve is manufactured using a machining process, more especially a lathe shaping one. In the latter case, the dimensional requirements are met by the process itself.

Such design has the disadvantage of heavily burdening the cost price of the sleeve, since accurate dimensions must be complied with.

SUMMARY OF THE INVENTION

In order to cope with this difficulty, the present invention provides a sleeve, the dimensions of which can be adjusted merely by a plastic deformation process.

Therefore, this invention provides a servomotor of the above-described type, characterised in that the sleeve comprises a first adjusting part, situated between the front and rear faces of the finger, and a second adjusting part, situated between the rear face of the finger and the locking element, said parts being plastically deformable at least in the axial direction so as to allow the adjustment of the servomotor prior to the assembly.

According to other features of this invention:

- the latching element consists of a substantially annular key, which surrounds the sleeve with a given clearance and which is capable of being driven by the moving piston, when the input force is applied, at the determined speed, so as to rock about a generally transverse axis, in such a way that a peg on the key may abut against a rear transverse face of the sleeve, constituting the locking element;
- the sleeve comprises a tubular front cylindrical section, the end of which constitutes the finger, and a tubular rear cylindrical section having a substantially greater diameter than that of the front section, and including a radial groove, a shoulder-forming front transverse face of which is the locking rear transverse face;
- the front section comprises an inner annular flange extending rearwardly and protruding from the rear face of the finger, said flange being axially deformable prior to the assembly so as to constitute the first adjusting part for the adjustment of the position, or jump of the servomotor, in which the finger will bias the reaction disk;
- the front section and the rear section of the sleeve are separated by a reduced-thickness intermediate section, which is axially deformable so as to constitute the second adjusting part for the adjustment of the tripping position, in which the key peg abuts against the locking rear transverse face;
- the groove exhibits a substantially truncated-cone-shaped profile, rearwardly of the shoulder-forming front transverse face;
- the peg has the shape of a concave truncated-cone-shaped angular sector, which is complementary to the truncated-cone-shaped profile of the groove in the sleeve;
- the key has, in an axial sectional view, the shape of a tee, the vertical branch of which is substantially radially directed and traversed by the sleeve, whereas its horizontal branch, which is substantially axially directed, is received, without any axial clearance, between two opposite walls of a cavity traversing the piston, perpendicularly to its axis, so as to allow but a rocking motion of the key inside the cavity;
- the front horizontal half-branch of the tee key has a face which radially faces the sleeve and from which the peg protrudes;
- the tee key is resiliently biased against the rear transverse wall of the cavity by two compression springs, arranged between the front transverse wall of the cavity and blind holes for the centering of the tee key and made on both sides of the sleeve, in the vertical branch of the tee;
- the sleeve is made of a material exhibiting a low elastic limit arid a high toughness.

The invention also provides a setup for the plastic deformation of a tubular sleeve intended for a pneumatic servomotor of the previously described type, and comprising, in the front-to-rear direction, a tubular front cylindrical section having a determined outer diameter and closed at its end by a front transverse wall from which a deformable annular coaxial flange, constituting a first adjusting part, extends towards the inner part of the sleeve, a deformable intermediate section with the same outer diameter as the front section and constituting a second adjusting part, and a tubular rear cylindrical section having a determined diameter, greater than that of the front section, and including at least one shoulder-forming rear transverse face.

To this end, this invention provides a setup of the above-described type, characterised in that it comprises a male die and a female die, which are tubular and coaxial, the sleeve being placed between them so as to be deformed in a single axial-compression deformation process, in the course of which the dies are axially pressed together for the simultaneous attainment of the predetermined required dimensions for the first and second adjusting parts.

According to other features of this setup:

- the inner diameter of the tubular female die is greater than the outer diameter of the rear section of the sleeve, and the female die comprises a rear transverse wall from which a cylindrical bearing surface extends in the forward direction, and on which the sleeve is fitted in such a way that a front end of the cylindrical bearing surface may rest on the annular flange of the sleeve;
- the male die includes a bore with a diameter corresponding to the outer diameter of the front section of the sleeve, and a front transverse bottom of which will support the front transverse wall of the front section of the sleeve;
- the male die comprises a convex cylindrical bearing surface, protruding rearwards and designed to receive a first tubular adjusting shim having a determined length and arranged in the continuation of the tubular female die;
- the setup comprises a pressing front tubular spacer to be fitted on the sleeve, axially into contact with the shoulder-forming transverse face of the sleeve, and a second rear tubular adjusting shim having a determined length, both of them being provided for a fitting inside the female die, between the cylindrical bearing surface of the female die and its inner cylindrical wall, prior to the axial-compression deformation process;
- the male die is stationary and the female die is mounted for an axial sliding motion so as to be pressed towards the male die with a compressive force having a determined value.

Other features and advantages of the present invention will be apparent from the following detailed description, when taken in conjunction with the accompanying drawings.

DETAILED DESCRIPTION OF THE INVENTION

Figure 1:
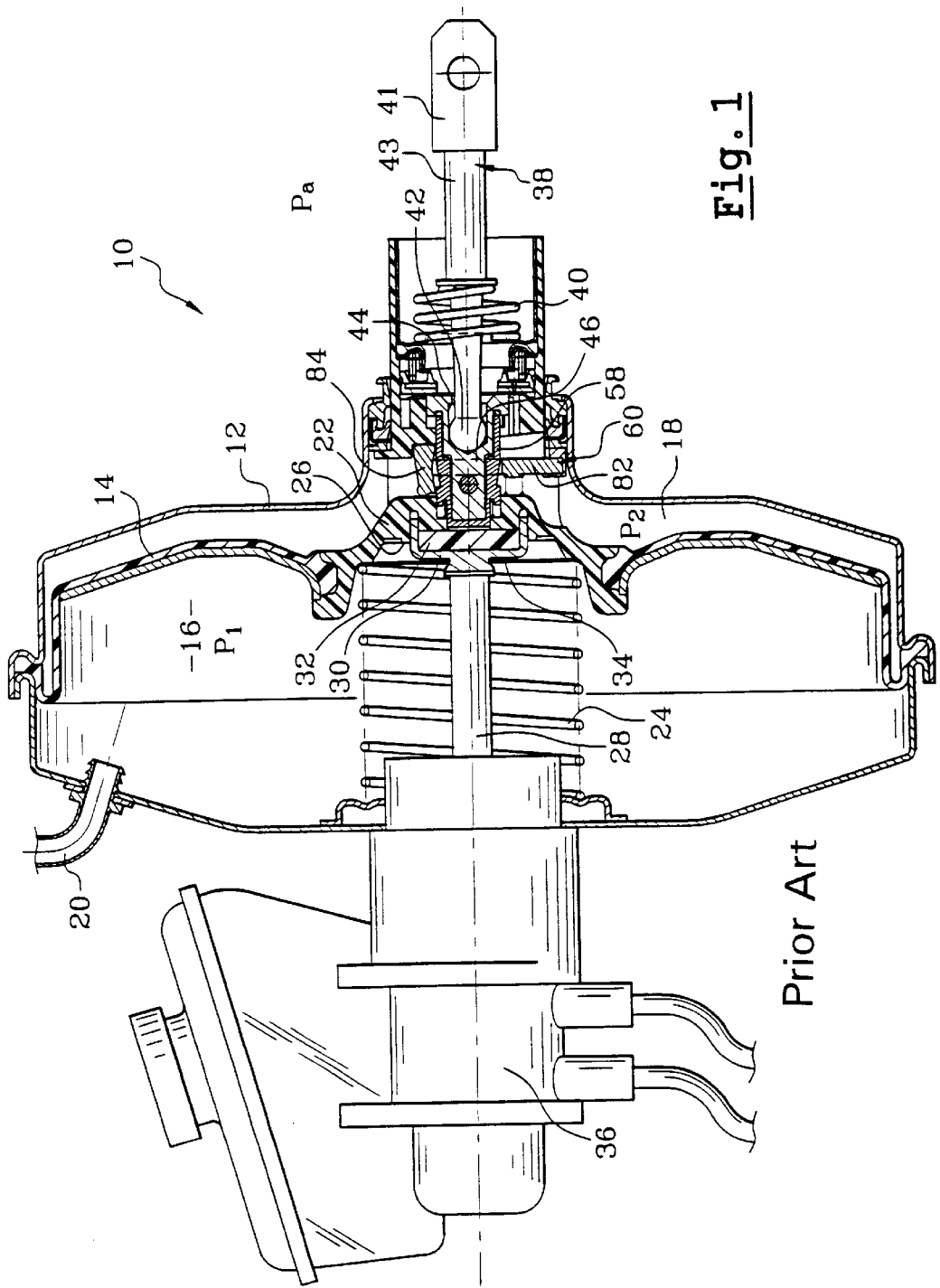
FIG. 1 is a general view of a servomotor according to the state of the art.

In the following description, the same reference numerals will designate the same elements, or elements having similar functions.

As a rule, the terms "front", "rear", "upper" and "lower" refer respectively to elements or positions facing leftward, rightward, upward or downward in FIG. 1 through 5.

FIG. 1 illustrates a pneumatic servomotor 10 for an assisted braking of a motor vehicle.

In a well-known manner, the pneumatic servomotor 10 comprises a rigid casing 12, in which a transverse partition wall 14 is movably mounted, so as to define therein, in an airtight manner, a front chamber 16 under a first pressure "$P_1$", the value of which is equal to the negative pressure value of the vehicle engine, and a rear chamber 18 under a second pressure "$P_2$". The second pressure "$P_2$" may vary between the engine negative pressure value "$P_1$" and the atmospheric pressure "$P_a$", as will be further explained hereunder.

The front chamber 16 is supplied with the pressure "$P_1$" through a negative-pressure pipe 20, connected to a vacuum source of the vehicle, for instance a negative pressure prevailing in an inlet manifold (not shown) of a vehicle engine.

The pneumatic servomotor 10 comprises a moving piston 22, integral with the moving partition wall 14. Inside the casing 12, the moving partition wall 14 is resiliently returned by a return spring 24, which rests on the casing 12 and on a front face 26 of the moving piston 22. The front face 26 of the moving piston 22 carries a reaction cup 30, in which a reaction disk 32, made of an elastomeric material, is accommodated in a manner to be described below. The front face 34 of the reaction cup 30 is integral with an actuating rod 28, which therefore travels with the moving piston 22, for the actuation of a hydraulic-brake master cylinder 36 of the vehicle.

A control rod 38, e.g. connected to the brake pedal of the vehicle through a coupling sleeve 41, arranged at its free rear end 43, may selectively travel within the moving piston 22, as a function of an input axial force, applied to the control rod 38 in the forward direction. The actuation force is exerted against a return force, applied to the rod 38 by a return spring 40, arranged between the moving piston 22 and the control rod 38.

Figure 2:
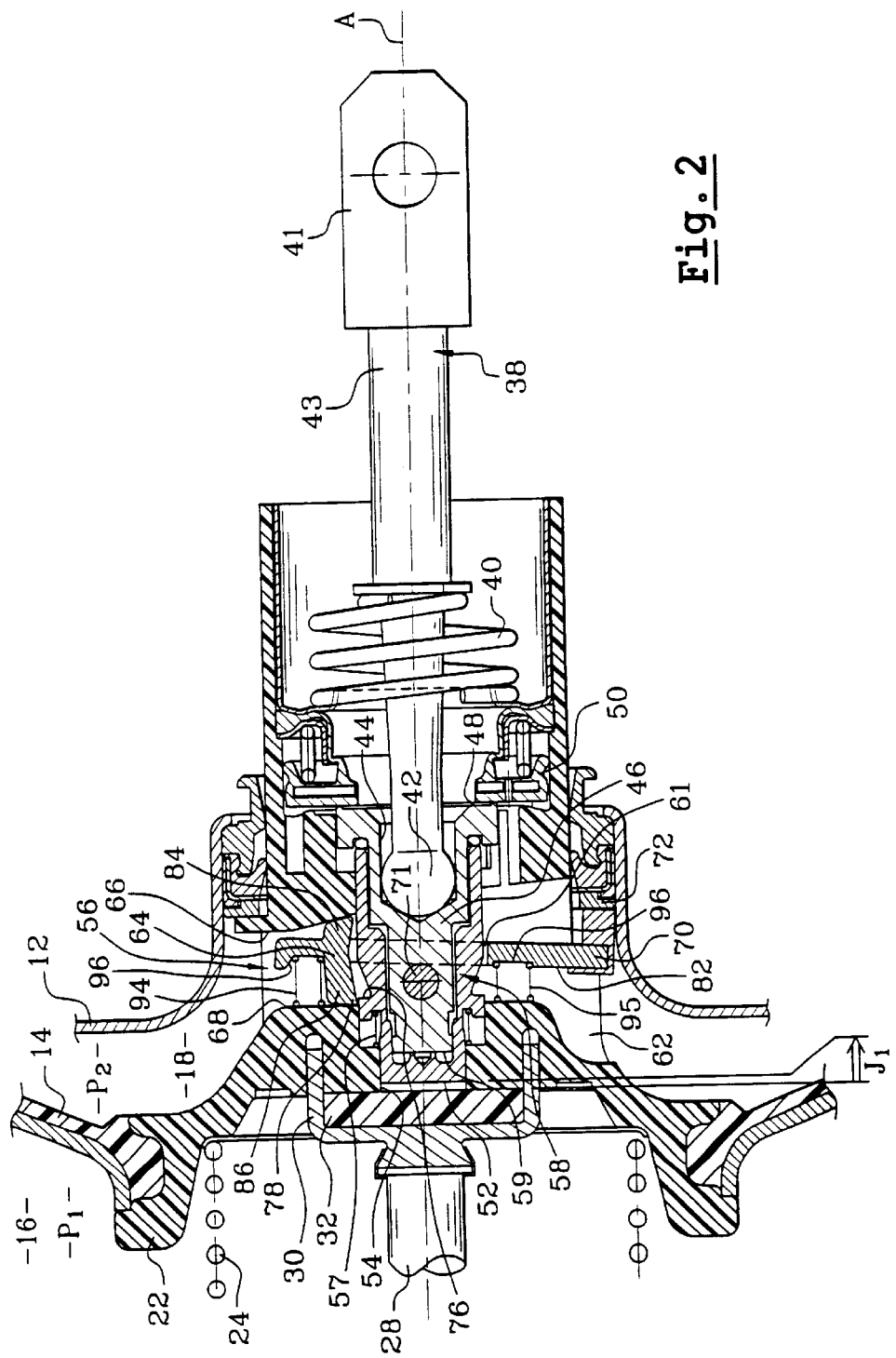
FIG. 2 is a detail axial sectional view, showing a pneumatic servomotor for an assisted braking according to this invention, the unidirectional clutch device being in the inactive position.

FIG. 2 shows more specifically that the front end of the control rod 38 is shaped into a toggle 42, received in a housing 44 having a complementary shape and provided in a substantially cylindrical plunger 46, which is slidably mounted in the moving piston 22.

A rear annular seat 48 of the plunger 46 belongs to a three-way valve 50, capable of varying the second pressure "$P_2$", prevailing in the rear chamber 18, more particularly by connecting the front chamber 16 with the rear chamber 18 when the control rod 38 is in the rest position, or by gradually subjecting the rear chamber 18 to the atmospheric pressure "$P_a$" when the control rod 38 is actuated.

Since the mode of operation of the three-way valve 50 is known from the state of the art, it will not be further described herein.

In a well-known manner, a finger 52 is formed at the front end of a sleeve 58, slidably fitted on the front end of the plunger 46, in the opposite direction to the housing 44. Besides, the front end of the sleeve 58, constituting the finger 52, is slidably fitted inside a bore 54 provided in the moving piston 22 and opening facing the reaction cup 30. Therefore, the sleeve 58 and the finger 52 are capable of being biased by the plunger 46 so that the finger 52 may bias, in turn, the reaction disk 32 and compress it, and thus the reaction force of the moving piston 22 is transferred onto the plunger 46 and, in consequence, onto the control rod 38, in an end-of-stroke actuating position of the control rod 38.

Figure 3:
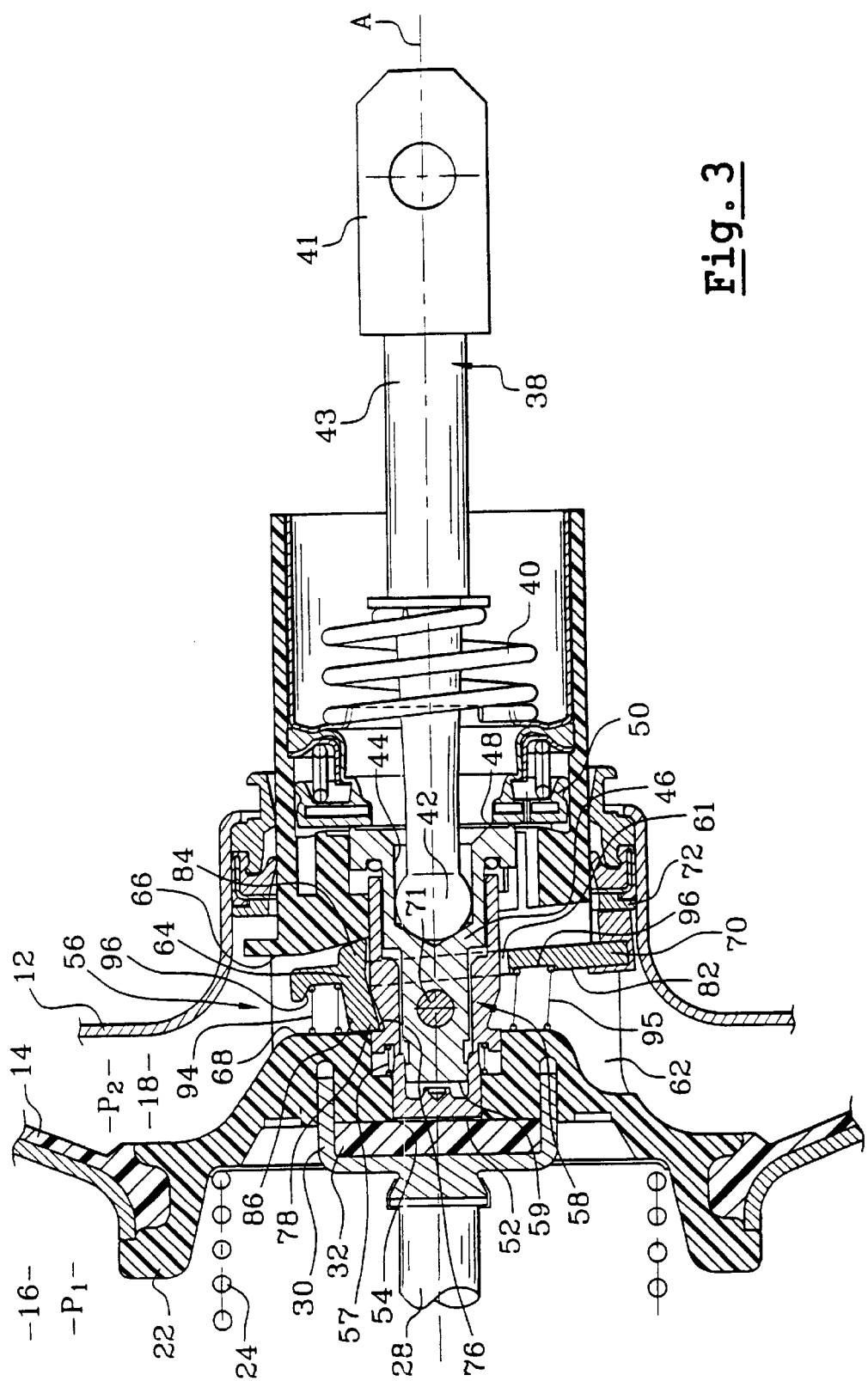
FIG. 3 is a detail axial sectional view, showing a pneumatic servomotor for an assisted braking according to this invention, the unidirectional clutch device being in the active position.

As is well known too, and as shown in FIGS. 2 and 3, the servomotor 10 includes a unidirectional clutch device 56, comprising, on the one hand, a locking element which forms part of the coaxial sleeve 58, and comprising, on the other hand, a moving latching element, consisting of a substantially annular key 60, fitted around the sleeve 58 with a radial clearance.

To this end, the coaxial sleeve is slidingly mounted on the plunger 46 and resiliently returned through a spring 57, which is arranged between the piston 22 and the sleeve 58, into contact with a front transverse face 59 of the plunger 46.

Besides, when the servomotor 10 is in the assembled state, the sleeve 58 passes through a circular opening 61 provided in the key 60.

The key 60 is received within a cavity 62, traversing the piston 22 perpendicularly to its axis "A". The key 60 is resiliently biased into abutment against a rear wall 66 of the cavity 62.

In a well-known manner, in the rest position illustrated in FIG. 2, a lower part 70 of the key 60 bears on a support 72 provided on the casing 12 of the servomotor 10. A transverse pin 71, extending transversely through the sleeve 58 and the plunger 46, bears, in the rest position of the control rod 38, on a front face of the key 60 so as to define the rest position of the plunger 46.

In that way, when an input force is applied to the control rod 38 at a reduced speed, the pressure equalization in the front chamber 16 and the rear chamber 18 takes place slowly enough for the moving partition wall 14 and thus the moving piston 22 to travel at a speed which is substantially equal to that of the sleeve 58, driven by the plunger 46. As will be further explained herebelow as regards the servomotor 10 according to the invention, at that time, the unidirectional clutch device 56 remains in the inactive state since the key 60 bears on the sleeve 58.

On the other hand, and as shown in FIG. 3, if an input force is applied in the forward direction, in accordance with a full stroke of the control rod 38, and at a determined speed of the latter, the plunger 46 drives the sleeve 58 at a higher speed than that of the moving piston 22. It results in that an upper part 64 of the key 60 is driven by the piston 22, whereas its lower part 70 separates from the support 72. Owing to the fact that the key 60 is no longer resting on the sleeve 58, it rocks about a generally transverse axis anti-clockwise so as to cooperate with a locking element on the periphery of the sleeve 58, more especially a rear transverse face 76 of the sleeve.

So, if the driver releases the force exerted on the control rod 38 too soon, the sleeve 58 is locked by the key 60 in an end front axial position, in which the finger 52 biases the reaction disk 32, independently of the plunger 46 and the control rod 38, which means that a maximum braking force is maintained as long as the return of the control rod 38 does not cause the three-way valve 50 to reopen and, consequently, the piston 22 to move backwards in the return direction.

In a well-known manner, the unidirectional clutch device 56 is represented in the drawings as comprising a latching element, i.e. the above-described key 60, but it stands to reason that the device may also comprise a moving latching element of another type, capable of axially securing the rear transverse face 76 of the sleeve 58 in an accurate manner.

The servomotor 10 of the invention, which will be described more specifically with reference to FIGS. 2 and 3, comprises a unidirectional clutch device 56 wherein the key 60 has a peg 78 which, in the active position of the clutch device, abuts against the locking element-forming rear transverse face 76 of the sleeve 58 as to lock the sleeve 58 in a precise axial position.

Figure 4:
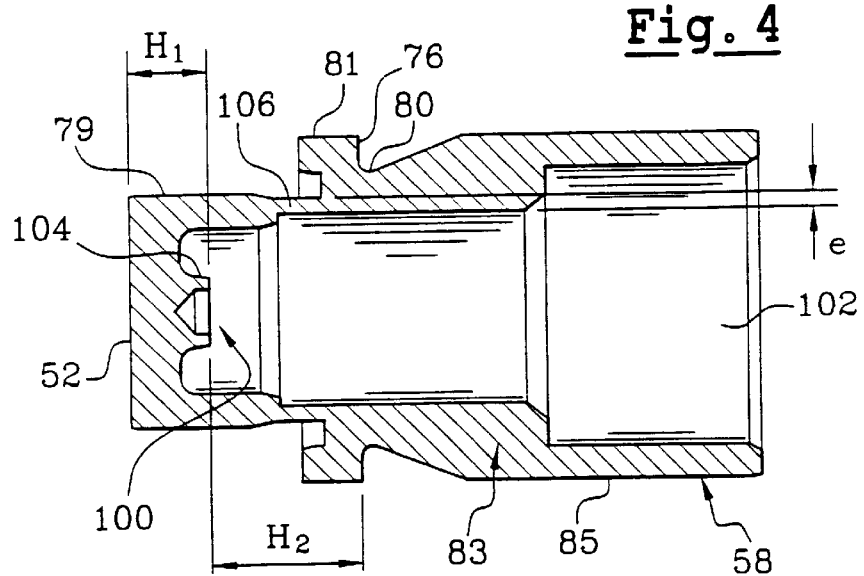
FIG. 4 is an axial sectional view, showing a sleeve for the unidirectional clutch device of FIG. 1 or 2.

FIG. 4 shows that the sleeve 58 comprises a tubular front cylindrical section 79, the end of which constitutes the finger 52, and a tubular rear cylindrical section 83 having a substantially greater diameter than that of the front section, and including a radial groove 80, a shoulder-forming front transverse face of which is the locking rear transverse face 76. Therefore the radial groove 80 defines, in the rear section 83, a front cylindrical bearing surface 81 and a rear cylindrical bearing surface 85.

The groove 80 exhibits a substantially truncated-cone-shaped profile, rearwardly of the shoulder-forming front transverse face 76. It results in that the end of the groove 80, opposite the shoulder-forming front transverse face 76, gradually merges into the cylindrical periphery of the rear section 83 of the sleeve 58.

The truncated-cone shape of the groove 80 made in the sleeve 58 is particularly advantageous in that, on the rocking of the key 60, its peg 78 can be guided, the peg 78 having the shape of a concave truncated-cone-shaped angular sector, complementary to the truncated-cone-shaped profile of the groove 80, up to its resting position against the shoulder-forming front transverse face 76 of the sleeve 58.

The circular opening 61, made in the key 60 and surrounding the sleeve 58, does not take part in the locking of the sleeve 58. It is the peg 78 which takes charge of such locking function.

As a matter of fact, as shown more especially in FIGS. 2 and 3, the key 60 (tee key) has, in an axial sectional view, the general shape of a tee, the vertical branch 82 of which is substantially radially directed and includes the opening 61, which is traversed by the sleeve 58. The tee key 60 comprises a horizontal branch 84, which is substantially axially directed, perpendicularly to the main branch 82 and which is received, without any axial clearance, between the front wall 68 and the rear wall 66 of the cavity 62 traversing the piston 22, perpendicularly to the axis "A" of the latter.

Such configuration offers the advantage of allowing only a rocking motion of the tee key 60 within the cavity 62. As a matter of fact, the key tee 60 cannot move axially in relation to the cavity 62, but yet its branch 84 can rock into the cavity 62, as shown in FIG. 3.

The peg 78 is located under the horizontal branch 84 of the tee key 60. More particularly, the front horizontal half-branch 86 of the tee key has a face which radially faces the sleeve 58 and from which the peg 78 protrudes.

The tee key 60 is resiliently biased against the rear transverse wall 66, of the cavity by two compression springs 94 and 95, arranged between the front transverse wall 68 of the cavity 62 and blind holes 96 for the centering of the tee key 60 and provided on both sides of the sleeve, in the vertical branch 82 of the tee.

It results in that, when no force is exerted on the control rod 38, the tee key 60 is located as represented in FIG. 3, its horizontal branch 84 being substantially parallel to the axis A of the piston 22, whereas its vertical branch 82 is substantially perpendicular to the axis A.

When the driver actuates the control rod 38 at a comparatively low speed, which corresponds to a gradual braking operation, the moving piston 22 travels substantially at the same speed as the plunger 46, since the atmospheric pressure "$P_a$" becomes progressively established as the three-way valve 50 opens. In this configuration, owing to the fact that the horizontal branch 84 is retained between the front wall 68 and the rear wall 66 of the cavity 62 without any possibility of an axial motion, the tee key 60 rocks as soon as the vertical branch 82 of the key separates from the support 72 integral with the casing 12. Then the peg 78 comes into contact with the sleeve 58, at the front bearing surface 81 of the rear section 83, but it does not engage the truncated-cone-shaped groove 80, since the sleeve 58 and the moving piston 22 travel at substantially the same speed.

Therefore, if the driver releases the braking force, the tee key 60 does not lock the sleeve 58 and it does not either oppose the front-to-rear travel of the moving piston 22.

On the other hand, if the driver pulls violently the control rod 38, which corresponds to an emergency braking situation, the plunger 46 moves forward faster than the moving piston 22 does, owing to the delay involved in the equalization of the pressure in the rear chamber 18. As a result, on the rocking of the tee key 60, the peg 78 separates from the front bearing surface 81, falls into the groove 80 and slides in it till it abuts against the shoulder-forming face 76 for an accurate axial locking of the sleeve 58.

So, if the driver releases somewhat the braking force, the tee key 60 locks the sleeve 58 and therefore the finger 52, thus opposing the return travel of the moving piston 22, independently of the position of the plunger 46. Such position ensures the maintaining of a maximum braking force on the piston 22.

When the driver releases the braking force to a great extent, the return motion of the control rod 38 actuates the plunger 46, the pin 71 of which biases the vertical branch 82 of the tee key 60 in the front-to-rear direction, which results in the unlocking of the tee key 60. Besides, the return of the plunger 46 causes the three-way valve 50 to open. The re-evacuation of the rear chamber 18 makes the piston 22 travel and therefore the tee key 60 is brought back to its rest position, since its horizontal branch 84 is guided between the front wall 68 and the rear wall 66 of the cavity 62 in the piston 22.

In such a servomotor 10, the sleeve 58 incorporating the finger 52 is mounted in such a way that, in the rest position, a given clearance "J1" may be extant between the finger 52 and the reaction disk 32, as shown in FIG. 2.

The size of the clearance "J1" determines the assisting force actually supplied by the moving piston 22 and for which a reaction force is transmitted, through the reaction disk 32, from the moving piston 22 to the control rod 38. The magnitude of the assisting force is commonly called the "jump" of the servomotor 10 and it depends on the dimensions of the finger 52 and, in particular, on the axial thickness "H1" of the finger 52, as illustrated in FIG. 4.

Moreover, in such a servomotor 10, if the input force happens to be applied onto the control rod 38 at a higher speed than the determined speed, the axial position of the locking element-forming rear transverse face 76 of the sleeve 58 conditions the speed at which the unidirectional clutch device 56 is likely to start. As a matter of fact, as long as the peg 78 of the key 60 can be retained by the front bearing surface 81 of the rear section 83, it does not fall into the groove 80 and the unidirectional clutch device 56 remains in the inactive state.

The predetermined speed is commonly known as the "tripping speed", and, therefore, as shown in FIG. 4, it depends on given dimensions of the sleeve, more particularly the axial distance H2 between a rear face 100 of the finger, at the bottom of the bore 102 in the sleeve 58 and on which the front transverse end 59 of the plunger 46 bears during its forward motion, and the shoulder-forming transverse face 76 of the sleeve 58.

Conventionally, the sleeve 58 would be manufactured using a lathe shaping process for the attainment of the accurate dimensions H1 and H2, suitable for a sound performance of the servomotor 10.

However, this shaping process has the disadvantage of heavily burdening the cost price of the sleeve, since accurate dimensions must be complied with on the manufacturing of the sleeve 58 and, besides, it calls for a unit inspection of the sleeves 58.

In order to cope with this difficulty, the present invention provides a sleeve 58, the dimensions of which can be adjusted merely by a plastic deformation process.

To this end, the sleeve 58 comprises a first adjusting part, situated between the front and rear faces of the finger 52, and a second adjusting part, situated between the rear face 100 of the finger 52 and the rear transverse face 76, these parts being plastically deformable at least in the axial direction so as to allow the adjustment of the servomotor 10 prior to the assembly.

For this purpose, according to the invention, the front section 79 comprises an inner annular flange 104 extending rearwardly and protruding from the rear face 100 of the finger 52, this flange being axially deformable prior to the assembly so as to constitute a first adjusting part for the adjustment of the position, or jump of the servomotor 10, in which the finger 52 will bias the reaction disk 32.

Besides, the front section 79 and the rear section 83 of the sleeve 58 are separated by an intermediate section 106 having a reduced thickness "e" and axially deformable so as to constitute the second adjusting part for the adjustment of the tripping position, in which the peg 78 of the key 60 abuts against the locking rear transverse face 76.

Figure 5:
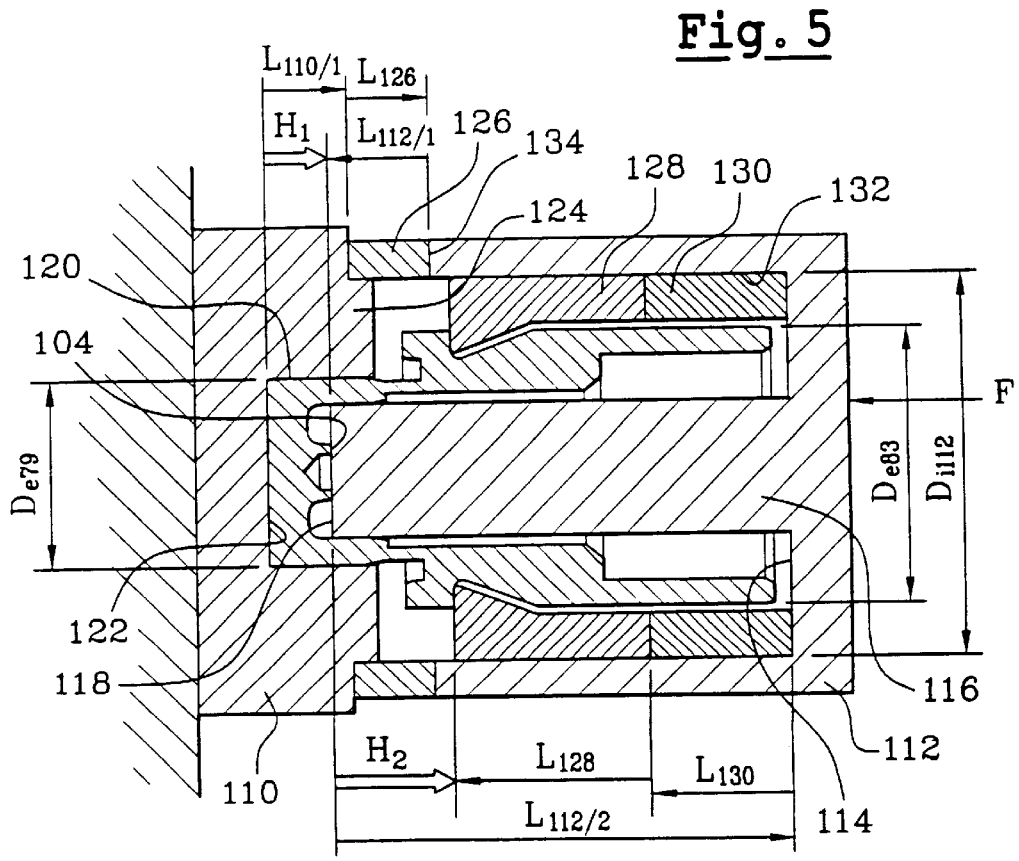
FIG. 5 is an axial sectional view of a setup for the plastic deformation of a sleeve according to FIG. 3.

With this object in view, the sleeve 58 is made of a material exhibiting a low elastic limit and a high toughness, and it is deformed in a deformation setup device 108, represented in FIG. 5, especially designed to deform the sleeve 58 plastically.

The setup device 108 comprises a male die 110 and a female die 112, which are tubular and coaxial, the sleeve 58 being placed between them so as to be deformed in a single axial-compression deformation process, in the course of which the dies 110 and 112 are axially pressed together for the simultaneous attainment of the predetermined required dimensions "H1" and "H2" for the first and second adjusting parts.

More particularly, the inner diameter $D_{i112}$ of the tubular female die 112 is greater than the outer diameter $D_{e83}$ of the rear section 83 of the sleeve 58, so as to accommodate the sleeve 58 within the female die 112. The female die 112 comprises a rear transverse wall 114 from which a cylindrical bearing surface 116 extends in the forward direction, and on which the sleeve 58 is fitted in such a way that a front end 118 of the cylindrical bearing surface 116 may rest on the annular flange 104 of the sleeve 58.

The male die 110 includes a bore 120, the diameter of which corresponds to the outer diameter $D_{e79}$ of the front section 79 of the sleeve 58. A front transverse bottom 122 of the bore 120 will support the front transverse wall 59 of the front section 79 of the sleeve 58.

The male die 110 comprises a convex cylindrical bearing surface 124, protruding rearwards and designed to receive a first tubular adjusting shim 126 having a determined length "$L_{126}$" and arranged in the continuation of the tubular female die 112.

The setup device 108 comprises a pressing front tubular spacer 128 to be fitted on the sleeve 58, axially into contact with the shoulder-forming transverse face 76 of the sleeve 58, and a second rear tubular adjusting shim 130 having a determined length "$L_{130}$", both of them being provided for a fitting inside the female die 112, between the cylindrical bearing surface 116 of the female die and its inner cylindrical wall 132, prior to the axial-compression deformation process.

Thus, the tubular shims 126 and 130 may be replaced, depending on the type of the servomotor concerned, for the attainment of different values for the dimensions "H1" and "H2".

In this configuration, the required dimension "H1" is obtained by means of the relationship:

$$H1 = L_{110/1} + L_{126} - L_{112/1} \tag{R1}$$

where $L_{110/1}$ indicates the dimension of the die 110, between its front transverse bottom 122 and a shoulder 132 on which the first tubular shim 126 bears, whereas $L_{112/1}$ refers to the dimension of the die 112, between its front end 134, on which the first tubular shim 126 bears, and the front end 118 of the cylindrical bearing surface 116.

Similarly, the required dimension "H2" is obtained by means of the relationship:

$$H2 = L_{112/2} - L_{130} - L_{128} \tag{R2}$$

where $L_{112/2}$ indicates the dimension of the die 112, between the front end 118 of its cylindrical bearing surface 116 and the rear transverse wall 114, and where $L_{128}$ refers to the length of the spacer.

Therefore, as appears from FIG. 5, the required dimensions H1 and H2 depend directly on the lengths of the tubular shims 126 and 130.

Typically, during the deformation process, each one of the initial dimensions H1 and H2 is reduced by 0–0.5 mm.

Last, for the deformation of the sleeve 58, the male die 110 is stationary and the female die 112 is mounted for an axial sliding motion so as to be pressed towards the male die 110 with a compressive force F having a determined value. The direction of the compressive force F as well as its point of application are shown in FIG. 5.

Therefore, in an advantageous manner, the present invention provides a servomotor 10 at a low cost, with the benefit of a maximum braking force in emergency braking situations, whatever the driver's behaviour may be following the jamming on of the brakes.

We claim:

1. A pneumatic servomotor for assisted braking of a motor vehicle, said servomotor having a rigid casing with a transverse partition wall located therein to define in an airtight manner a front chamber connected to receive a first pressure (vacuum) and a rear chamber connected to selectively receive said first pressure and a second pressure (atmospheric pressure), said partition wall having an integral piston with a bore therein for receiving a control rod, said control rod moving within said bore in response to axial input force exerted in the forward direction against a return force applied to the control rod by a return spring towards either an intermediate actuation position or an end actuation position, said intermediate actuation position and an end actuation position being determined by a predetermined speed at which said input force is applied to said control rod; a plunger located in said bore adjacent a front end of said control rod, and a three-way valve, including at least an annular seat borne by a rear section of said plunger, said annular seat allowing said rear chamber to be opened to said front chamber and receive said first pressure from said front chamber when said control rod is in a rest position and closed to said front chamber when an input force moves said plunger from said rest position to allow said second pressure to be gradually supplied to said rear chamber as said plunger moves toward said intermediate actuation position and said end actuation position; said first pressure in said front chamber and said second pressure in said rear chamber creating a pressure differential that acts on said partition wall to develop a force that moves said movable wall toward the front chamber, a finger having a front face and a rear face, said finger being slidingly fitted at a front end of said plunger and biased by said plunger so that said front face of said finger comes into contact with a reaction disk that is integral with the moving piston when said control rod is in said end actuation position so as to transmit a reaction force from said moving piston to said plunger and to the control rod; and a unidirectional clutch device, that includes at least one coaxial tubular sleeve that slides on said plunger, said finger being defined by a front end of said sleeve, and a latching element that is movable between an inactive position and an active position as a function of said end actuation position of the control rod, said latching element when in said active position co-operates with a locking element of sleeve to lock said sleeve in an end front axial position in such a way that said finger may lock the movement of said moving piston, independently of the movement of said plunger and control rod, said sleeve being characterised by a first adjusting part, situated between said front and rear faces of said finger and a second adjusting part, situated between said rear face of said finger and said locking element, said first and second adjusting parts being plastically deformable at least in the axial direction to allow for the adjustment of an intermediate actuation position and said end actuation position of said control rod prior to the assembly of said servomotor, said latching element including a substantially annular key that surrounds said sleeve with a given clearance and is driven by said piston when an input force is applied at a predetermined speed so as to rock about a generally transverse axis in such a way that a peg on said annular key abuts against a rear transverse face of said sleeve to define said locking element, said annular key having an axial sectional view in a shape of a tee, said tee having a vertical branch of that is substantially radially directed and traversed with said sleeve such that a front horizontal half-branch of a face of said tee radially faces said sleeve, protrudes from said peg and is axially directed by being resiliently biased against the rear of one of said opposite walls of the cavity by two compression springs that are located between a front wall of said cavity and blind holes on both sides of the sleeve to center said tee of said key, said tee being without any axial clearance between two opposite walls in a cavity traversing said piston while allowing a rocking motion of said key inside the cavity to lock said sleeve within said piston.

2. The servomotor according to claim 1, characterised in that said sleeve comprises a tubular front cylindrical section and an end thereof constitutes said finger and a tubular rear cylindrical section thereof has a substantially greater diameter than a diameter of a front section thereof, and said sleeve has a radial groove and a shoulder-forming front transverse face that defines said rear transverse face.

3. The servomotor according to claim 2, characterised in that said front section comprises an inner annular flange extending rearwardly and protrudes from a rear face of said finger, said flange being axially deformable prior to the assembly so as to constitute said first adjusting part for the adjustment of the position at which said finger engages said reaction disk.

4. The servomotor according to claim 3, characterised in that said groove exhibits a substantially truncated-cone-shaped profile, rearwardly of said shoulder-forming front transverse face.

5. The servomotor according to claim 4, characterised in that said peg has the shape of a concave truncated-cone-shaped angular member that is complementary to with said ated-cone-shaped profile of said groove in said sleeve.

6. The servomotor according to claim 2 characterised in that said front section and said rear section of said sleeve are separated by an intermediate section having a reduced thickness and axially deformable so as to constitute said second adjusting part for the adjustment of a tripping position where said peg of the key abuts against said locking rear transverse face.

7. The servomotor according to claim 1, characterised in that said sleeve is made of a material exhibiting a low elastic limit and a high toughness.

8. The servomotor as recited in claim 1, wherein said sleeve is characterised in a front-to-rear direction, by a tubular front cylindrical section having a determined outer diameter that is closed at a first end by a front transverse wall from which a deformable annular coaxial flange extends, said flange constituting said first adjusting part that extends towards an inner part of said sleeve, said sleeve having a deformable intermediate section with a same outer diameter as said front section that constitutes said second adjusting part, said sleeve having a tubular rear cylindrical section with a determined diameter that is greater than said diameter of said front section and at least one shoulder-forming a rear transverse face.

9. The servomotor according to claim 8 characterised in that a first front tubular spacer is fitted on said sleeve and is axially in contact with the shoulder-forming transverse face of said sleeve and a second spacer is situated between said rear face of the finger and said locking element.

* * * * *